US008086735B2

(12) United States Patent
Lee

(10) Patent No.: US 8,086,735 B2
(45) Date of Patent: Dec. 27, 2011

(54) METHOD, SYSTEM AND COMPUTER-READABLE RECORDING MEDIUM FOR PROVIDING DATA TO DISPERSED USERS USING CACHED DATA BASED ON MIRRORING

(75) Inventor: Jai Hyuk Lee, Daejeon-si (KR)

(73) Assignee: ARA Networks Co. Ltd., Daejeon-Si (KR)

( * ) Notice: Subject to any disclaimer, the term of this patent is extended or adjusted under 35 U.S.C. 154(b) by 0 days.

(21) Appl. No.: 12/576,836

(22) Filed: Oct. 9, 2009

(65) Prior Publication Data

US 2011/0022654 A1 Jan. 27, 2011

(30) Foreign Application Priority Data

Jul. 23, 2009 (KR) ........................ 10-2009-0067475

(51) Int. Cl.
*G06F 15/173* (2006.01)

(52) U.S. Cl. ........ 709/226; 709/202; 709/203; 709/205; 709/217; 709/218; 709/219; 709/225; 709/229

(58) Field of Classification Search .................. 709/202, 709/205, 217, 218, 219, 225, 226, 229, 203
See application file for complete search history.

(56) References Cited

U.S. PATENT DOCUMENTS

| | | | |
|---|---|---|---|
| 5,694,581 A * | 12/1997 | Cheng | 710/7 |
| 6,490,615 B1 * | 12/2002 | Dias et al. | 709/219 |
| 6,658,463 B1 * | 12/2003 | Dillon et al. | 709/219 |
| 7,149,730 B2 * | 12/2006 | Mullins et al. | 1/1 |
| 2007/0067417 A1 * | 3/2007 | Burroughs et al. | 709/218 |
| 2010/0011001 A1 * | 1/2010 | Holmes | 707/9 |

* cited by examiner

*Primary Examiner* — Liangche A Wang
(74) *Attorney, Agent, or Firm* — Mannava & Kang, PC

(57) ABSTRACT

A method for providing information to dispersed users based on an integrative cache on a communication network is provided. The method includes collecting information on the communication network, integrating the collected information and storing the collected information as a cache in a database, receiving an information request from the terminal device of the dispersed users, and determining in a symmetrical area of the communication network if the requested information exists as a cache in the database to control the path of the requested information.

13 Claims, 3 Drawing Sheets

METHOD, SYSTEM AND COMPUTER-READABLE RECORDING MEDIUM FOR PROVIDING DATA TO DISPERSED USERS USING CACHED DATA BASED ON MIRRORING

CROSS-REFERENCE TO RELATED APPLICATION

This application claims priority to and the benefit of Korean Patent Application No. 10-2009-0067475, filed Jul. 23, 2009, the disclosure of which is incorporated herein by reference in its entirety.

FIELD OF THE INVENTION

The present invention relates to a method, a system and a computer-readable recording medium for providing information to dispersed users using a mirroring-based data cache.

More particularly, the present invention relates to a method, a system and a computer-readable recording medium for efficiently providing information (e.g., contents) to user terminal devices, which are dispersed over certain areas, by integratively operating a mirroring-based data cache on a communication network.

BACKGROUND OF THE INVENTION

Nowadays, a user can easily obtain various information via a communication network with the spread of digital devices for wired or wireless communication such as a personal computer, a workstation, a PDA, a mobile phone, an IPTV receiver, etc. For an example, on the internet, the most popularized communication network, a user can access a web site with a digital terminal device such as a personal computer, and then utilize various contents, such as a document, a photo, a moving picture, a cartoon, a map, a blog, a mini-homepage, sound, music, a skin, an avatar, etc., from the web site. Usage of contents on the internet is being increased day by day.

However, since the information processing capability on the internet meets with a limit, there are reported many problems including retarded access to information, which is due to an overload.

In order to resolve the problems, a policy for an ISP (Internet Service Provider) to utilize dedicated cache servers and store caches therein is generally employed. Caching is helpful to reduce the traffic on the internet fundamentally and the time required to respond to a user's request.

FIG. 1 schematically represents the conventional system comprising dispersed cache servers.

With reference to FIG. 1, the entire system comprises a communication network 10, a plurality of dispersed cache servers 20, a plurality of user terminal devices 30 and a main server 40. Herein, a cache server 20 fetches frequently accessed information from the main server 40 via the communication network 10, and stores it on a storage device (not shown). Next, in case that a user terminal device 30 requests for information, a corresponding cache server 20 transfers the requested information directly to the user terminal device 30. Such implementation is generally called 'caching' and leads to improvement of the utilization efficiency of the communication network 10.

According to this caching technology, it is possible to provide information from a cache stored on a cache server 20 to a requesting user terminal device 30 without requiring it to directly access a main server 40. Therefore, the time to respond to a user's request may be remarkably shortened, and a load to a main server 40 and further to the entire communication network 10 may be decreased. Further, the communication network 10 may show robuster characteristics, even when it suffers from a local fault (e.g., a fault at a main server 40).

However, a cache server 20 as above cannot avoid a bottleneck phenomenon, in case that the number of users requesting for specific information grows and therefore the traffic by the users to access the information on the cache server 20 also increases. Thus, a method of dispersing cache servers 20 over areas as shown in FIG. 1 is generally preferred.

However, even with the dispersed cache servers, the following problems may be unresolved.

First, according to the conventional caching technology, physical and software obstacles may be frequently met. Generally, a cache server 20 and the storage device on the cache server 20 may be a source of a fault on the communication network 10 due to their own defects in hardware or software. Particularly, since the storage device for storing a cache itself is generally comprised of a mechanically structured hard disk, the storage device is required to be replaced with a new one due to its defects that may be generated when its unique threshold (e.g., a threshold for readings, writings or the like) has been reached. Especially in case that a plurality of cache servers 20 are dispersed at geographically distant locations, the cost and time to cure faults may also increase.

Further, according to the conventional caching technology, it is not easy to properly cope with an asymmetric routing environment. Most ISPs provide information to user terminal devices in a cache-based manner, and thus, generally apply a two-way transparency mode, where transparency means a feature that information is processed regardless of its storage location. However, according to the conventional caching technology, it is required for a normal service that a cache server 20 must receive the response by a main server 40 responding to a user's request in case that the user terminal device 30 originally issued the request toward the main server 40. However, under the asymmetric routing environment, it is difficult for a cache server 20 to receive all the responses from a main server 40. Therefore, the two-way transparency mode cannot be easily applied under the asymmetric routing environment, just following the conventional technology.

To resolve this problem, it may be supposed that a plurality of cache servers 20 be dispersed over smaller areas of the communication network 10, each of which is a symmetrical network. However, in this case, there may be a concern that each cache server 20 is located in too small an area, and thus, its cached information is also located in too small an area. This may lead to reduction of the traffic with each cache server 20 and degradation of the bandwidth usage.

Further, according to the conventional caching technology, each cache server 20 needs to have a high processing capability (e.g., a processing capability of no less than 10 Gbps). To meet this need, a great number of cache servers 20 and switches of a high capability are required. In other words, the total cost and/or the possibility of a fault being generated on the communication network 10 may increase.

Finally, according to the conventional caching technology, vulnerability to a fault at a central network may be problematic. Generally, since a central network composes a symmetrical routing environment, it is required to apply a switch into the central network and connect the switch to cache servers 20. Further, in case that a switch or a cache server 20 suffers from a fault, the entire communication network 10 may also suffer.

Therefore, there are urgent needs for advanced technologies for resolving the aforementioned problems and enabling efficient and stable caching.

SUMMARY OF THE INVENTION

It is, therefore, a primary object of the present invention to resolve all the problems caused by the aforementioned conventional technologies.

Another object of the present invention is to implement an integrative cache on a communication network, and thereby, enable efficient and stable caching.

Yet another object of the present invention is to collect, integratively classify, and store mirrored information.

Still yet another object of the present invention is to implement a caching system of high effectiveness and capability without having to contain a mechanically structured storage device in each symmetrical area of a communication network (esp., a communication network provided by ISPs).

Several representative configurations for achieving the aforementioned objects of the present invention are presented as follows.

In one aspect of the present invention, provided is a method for providing information to dispersed users based on an integrative cache on a communication network, the method comprising the steps of: collecting information on the communication network; integrating the collected information and storing the same as a cache in a database; receiving an information request from the terminal device of at least one of the dispersed users; and determining in a symmetrical area of the communication network if the requested information exists as a cache in the database to control the path of the requested information, wherein the path control is for enabling the user terminal device to be provided with the requested information from the database if the requested information exists as a cache in the database, and otherwise for enabling the user terminal device to be provided with the requested information from a server.

In another aspect of the present invention, provided is a system for providing information to dispersed users based on an integrative cache on a communication network, the system comprising: a collection unit for collecting information on the communication network; an information manager for integrating the collected information and storing the same as a cache in a database; and a path control unit located in a symmetrical area of the communication network for, in case an information request is received from the terminal device of at least one of the dispersed users, determining if the requested information exists as a cache in the database to control the path of the requested information, wherein the path control is for enabling the user terminal device to be provided with the requested information from the database if the requested information exists as a cache in the database, and otherwise for enabling the user terminal device to be provided with the requested information from a server.

Besides, various methods and systems for implementation of the present invention, and a computer-readable recording medium for recording a computer program to execute any one of the above methods will be further provided.

BRIEF DESCRIPTION OF THE DRAWINGS

The above objects and features of the present invention will become apparent from the following description of the preferred embodiments given in conjunction with the accompanying drawings, in which.

DETAILED DESCRIPTION OF THE PREFERRED EMBODIMENTS

Figure 1:
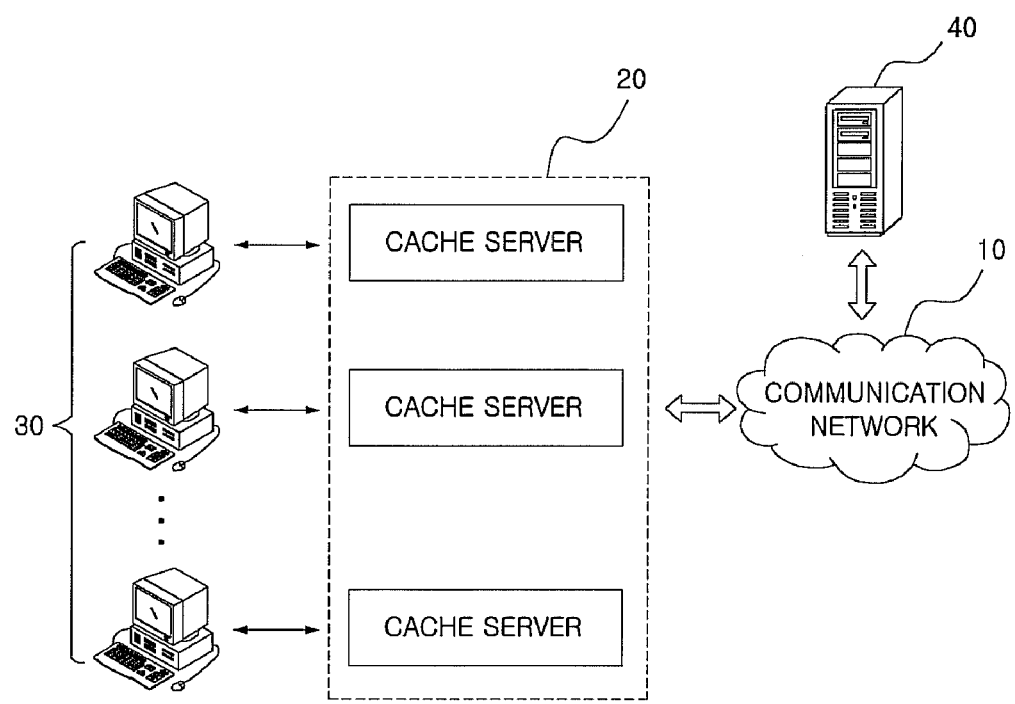
FIG. 1 schematically represents the conventional system comprising dispersed cache servers.

In the following detailed description, reference is made to the accompanying drawings that show, by way of illustration, specific embodiments in which the present invention may be practiced. These embodiments are described in sufficient detail to enable those skilled in the art to practice the present invention. It is to be understood that the various embodiments of the present invention, although different, are not necessarily mutually exclusive. For example, a particular feature, structure or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention will now be described in more detail, with reference to the accompanying drawings.

Configuration of the Entire System

Figure 2:
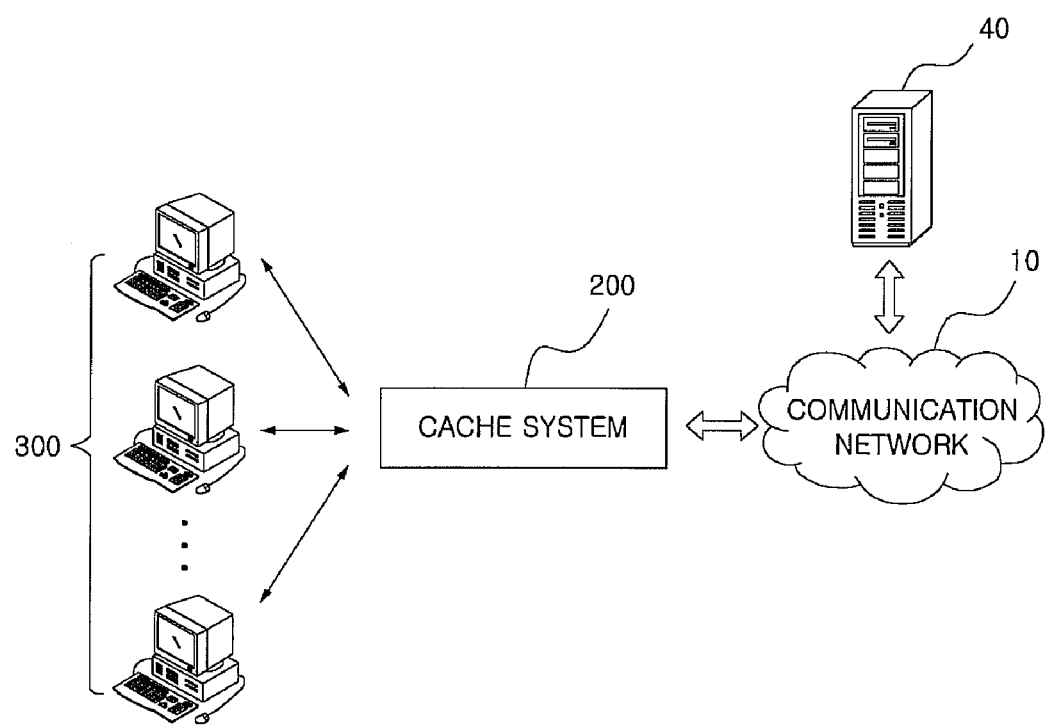
FIG. 2 schematically represents a system in accordance with one embodiment of the present invention for providing information to dispersed users using a mirroring-based cache.

FIG. 2 schematically represents a system in accordance with one embodiment of the present invention for providing information to dispersed users using a mirroring-based cache.

With reference to FIG. 2, the entire system in accordance with one embodiment of the present invention may comprise a communication network 100, a cache system 200, a user terminal device 300 and a main server 400.

First, a communication network 100 in accordance with one embodiment of the present invention may be constructed on wires or wirelessly, and comprise a LAN (Local Area Network), a MAN (Metropolitan Area Network), a WAN (Wide Area Network) or an FTTH (Fiber To The Home or Fiber To The Premises). Preferably, a communication network 100 of the present invention may be the well-known WWW (World Wide Web).

Next, a cache system 200 in accordance with one embodiment of the present invention may integratively classify and store information collected from the communication network 100 as a cache. For an example, the cache system 200 may collect contents from a main server 400 by using the HTTP protocol.

In the foregoing and following description, a content should be understood as digital information or an individual information element that can be accessed via a communication network 100, and in relation to the present invention, it should be understood that a content may comprise a datum such as text, an image, a moving picture, sound, a link (e.g., a web link) or any combination thereof.

Further, a cache system 200 in accordance with one embodiment of the present invention may distinguish information requested by user terminal devices 300 in a specific area (mainly, a symmetrical area) of the communication network 100, based on a cache, which is managed (collection/classification/storage) integratively, and issue an instruction so that the requested information may be provided from the cache or a main server 400. In this regard, detailed explanations will be further made below with reference to FIG. 3.

Next, a user terminal device 300 in accordance with one embodiment of the present invention may be a digital device with which a user can connect to and communicate with other device on wires or wirelessly. Examples of a user terminal device 300 are a personal computer (e.g., a desktop computer, a notebook computer and the like), a workstation, a PDA, a web pad, a mobile phone, an IPTV receiver and the like, each of which has a memory and a microprocessor for computational processes.

Especially, a user terminal device 300 may include a web browser (not shown) program for enabling a user to receive a content. Typically, in case that information requested by a user is stored in a cache system 200, the information may be provided from the cache system 200 to the web browser. On the other hand, in case that information requested by a user is not stored in the cache system 200, the information may be provided from a main server 400 to the web browser.

Finally, a main server 400 in accordance with one embodiment of the present invention may be an information providing device, which can communicate with a cache system 200 and/or a user terminal device 300. For example, this main server 400 may be a web server of one of various kinds, or an operation server for an Internet search portal site. The main server 400 may provide a content and information related thereto directly to a user terminal device 300 or provide a content or related information indirectly to a user terminal device 300 via a cache system 200.

Configuration of the Cache System

Hereinafter, the internal configuration and the elements of a cache system 200 in accordance with various embodiments of the present invention will be described.

Figure 3:
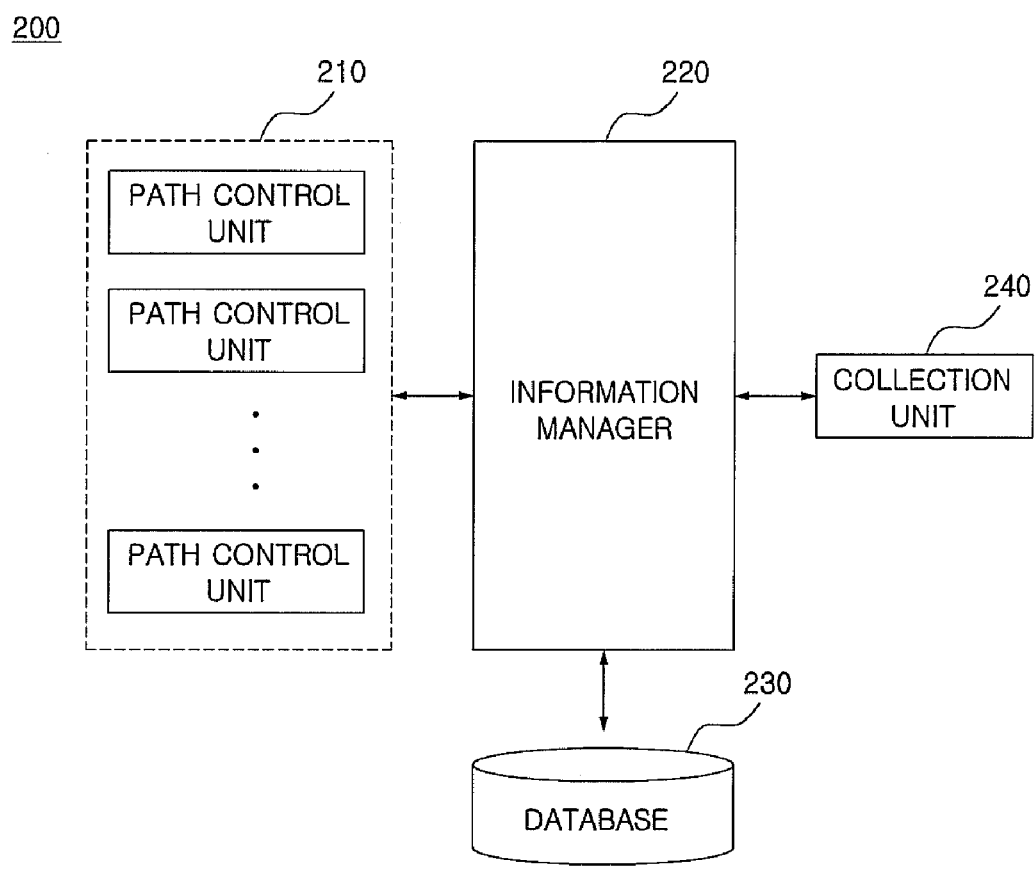
FIG. 3 is a block diagram showing the internal structure of a cache system in accordance with one embodiment of the present invention.

FIG. 3 is a block diagram showing the internal structure of a cache system in accordance with one embodiment of the present invention.

With reference to FIG. 3, a cache system 200 in accordance with one embodiment of the present invention may comprise a path control unit 210, an information manager 220, a database 230 and a collection unit 240.

According to one embodiment of the present invention, all or part of the elements corresponding to reference numerals 210 to 240 may be a program module that communicates with a user terminal device 300 and/or a main server 400. Such program modules may be in the form of operating systems, application program modules and other program modules, and be stored physically on various well-known memory devices. Alternatively, such program modules may be stored in a remote memory that can communicate with the cache system 200. Examples of such program modules include, but are not limited to, routines, subroutines, programs, objects, components and data structures for executing a specific task to be described later or a specific abstract data type according to one embodiment of the present invention.

First, a path control unit 210 in accordance with one embodiment of the present invention may be located in each symmetrical area of the communication network 100. Basically, the path control unit 210 may determine if information requested by a user terminal device 300 is stored in a database 230 of the cache system 200 as a cache, and control the path of the information.

In further detail, if the information requested by the user terminal device 300 exists in the database 230, the path control unit 210 may control the information providing path to enable the user terminal device 300 to be provided with the information from the database 230. Otherwise, the path control unit 210 may control the information providing path to enable the user terminal device 300 to access a main server 400 and be provided with the information therefrom. Considering the above function of the path control unit 210, the path control unit 210 may be called a 'redirector.' In this embodiment, it is preferable to disperse and arrange the path control units 210 in symmetrical areas of the communication network 100 in a manner that two or more path control units 210 do not exist in one symmetrical area.

According to a preferable embodiment of the present invention, a path control unit 210 does not perform caching inside itself. Accordingly, a path control unit 210 needs not be equipped with a storage device such as a mechanically structured hard disk, unlike a conventional cache server 20. In other words, the path control unit 210 can be remarkably light, convenient to maintain and less subject to a physical fault because the path control unit 210 can perform its unique function by using only a semiconductor memory that is driven electrically.

Next, an information manager 220 in accordance with one embodiment of the present invention may store collected information in a database 230 and manage it.

In further detail, the information manager 220 may classify collected information based on its kind or other criterion and store it on respective sectors in a database 230. In case that a plurality of databases 230 are employed to guarantee a scalability of the cache system 200, it is possible to classify information based on its kind or other criterion and store it on the plurality of databases 230. In this case, the information manager 220 may preferably manage location information on each database 230 so as to help maintain the plurality of databases 230.

Further, an information manager 220 in accordance with one embodiment of the present invention may renew the cache stored. This renewing function involves determining the validity of various information in a cache based on its attributes (e.g., a time stamp). This validity may be quantified as a term while the information is valid. This kind of term may be used for an appropriate request to be issued toward a main server 400 in case that information requested by a user exists in a database 230 but it is regarded as being obsolete. As described above, a request for information may be transferred by a path control unit 210.

Next, a database 230 in accordance with one embodiment of the present invention may be a typical storing means for storing information collected from the communication network 100.

Preferably, a database 230 may store a content and/or additional information related thereto (e.g., the term of validity of the content) that are associated with a specific URL (Uniform Resource Locator) or a specific URN (Uniform Resource Name). As described above, storing may involve logical information classification (so to speak, information classification in one database) or physical information classification (so to speak, information classification along a plurality of databases). Generally, the latter methodology may be considered more advantageous from the viewpoint of the scalability of the cache system 200.

A database 230 as above may adopt a mechanically structured hard disk for massive storage as its main recording medium. However, the present invention is not limited to the above configuration. In other words, the database 230 may include at least one well-known recording medium (e.g., a magnetic medium such as a hard disk, a floppy disk and a magnetic tape, an optical recording medium such as a CD-ROM and a DVD, and a magneto-optical medium such as a floptical disk). Further, though it is shown in FIG. 3 that the database 230 is configured separately from an information manage 220, the database 230 may be configured to be included in an information manage 220 or closely cooperate with an information manage 220, as necessary. Herein, the cooperation between the database 230 and the information manager 220 may be done physically, logically and/or geographically.

Finally, a collection unit 240 in accordance with one embodiment of the present invention may collect information that is eligible for cache information among the whole two-way traffic on the communication network 100.

In further detail, the collection unit 240 may determine if information corresponding to a pair of a request and a response among two-way traffic is to be cached, and store that information on a database 230 only when it is to be cached. Preferably, the collection unit 240 may duplicate information by using a tap mirroring method.

In this specification, tap mirroring may mean copying binary information flowing on an optical cable with an optical device and providing that information to other device (e.g., a cache system 200 of the present invention). However, besides tap mirroring, other techniques may be chosen as long as it is a technique for copying information on the communication network 100 and providing it to somewhere without affecting the communication network 100.

In other words, since the information that is actually collected according to the above embodiment is copied information, the information collection in accordance with the present invention does not affect the stability of the communication network 100 at all. As understood, the collected information is not necessarily related to a web content.

In addition, embodiments of the present invention further relate to computer storage products with a computer-readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

While embodiments of the present invention has been shown and described, it will be understood by those skilled in the art that various changes and modifications may be made without departing from the spirit and scope of the present invention as defined in the following claims.

What is claimed is:

1. A method for providing data to dispersed users based on an integrative cache on a communication network, the method comprising the steps of:

collecting data on the communication network by a tap mirroring technique;
integrating the collected data, and storing and managing the collected data as a cache in a database;
receiving a data request from the terminal device of at least one of the dispersed users;
determining in a symmetrical area of the communication network if the requested data exists as a cache in the database;
renewing the cache in the database and determining validity of the cache; and controlling a path of the requested data, wherein controlling the path is for enabling the user terminal device to be provided with the requested data from the database if the requested data exists as a valid cache in the database, and otherwise for enabling the user terminal device to be provided with the requested data directly from a server without utilizing the database.

2. The method of claim 1, wherein cacheable data is collected after receiving a duplicated traffic by the tap mirroring technique.

3. The method of claim 1, wherein the step for controlling the path includes the step of checking the term of validity of the cached data.

4. The method of claim 1, wherein controlling the path is performed with use of a storage device with a non-mechanical structure.

5. The method of claim 4, wherein the storage device with the non-mechanical structure is a semiconductor memory, a hard disk drive, or a solid state drive.

6. The method of claim 1, wherein controlling the path is performed with use of a storage device with a mechanical structure.

7. A system for providing data to dispersed users based on an integrative cache on a communication network, the system comprising:

a collection unit for collecting data on the communication network;
a data manager for integrating the collected data and storing the collected data as a cache in a database; and
a path control unit located in a symmetrical area of the communication network for, in case a data request is received from the terminal device of at least one of the dispersed users, determining if the requested data exists as a cache in the database, renewing the cache in the database and determining validity of data in the cache, and controlling a path of the requested data, wherein controlling the path is for enabling the user terminal device to be provided with the requested data from the database if the requested data exists as a valid cache in the database, and otherwise for enabling the user terminal device to be provided with the requested data directly from a server without utilizing the database.

8. The system of claim 7, wherein cacheable data is collected after receiving a duplicated traffic by a tap mirroring technique.

9. The system of claim 7, wherein the path control unit checks the term of validity of the cached data.

10. The system of claim 7, wherein the path control unit includes a storage device with a non-mechanical structure.

11. The system of claim 10, wherein the storage device having the non-mechanical structure is a semiconductor memory, a hard disk drive, or a solid state drive.

12. The system of claim 7, wherein the path control unit includes a storage device with a mechanical structure.

13. A non-transitory computer-readable recording medium in which a computer program for executing a method for providing data to dispersed users based on an integrative cache on a communication network is recorded, the method comprising:
- collecting data on the communication network;
- integrating the collected data and storing the collected data as a cache in a database;
- receiving a data request from the terminal device of at least one of the dispersed users;
- determining in a symmetrical area of the communication network if the requested data exists as a cache in the database;
- renewing the cache in the database and determining validity of data in the cache; and
- controlling a path of the requested data, wherein controlling the path is for enabling the user terminal device to be provided with the requested data from the database if the requested data exists as a valid cache in the database, and otherwise for enabling the user terminal device to be provided with the requested data directly from a server.

* * * * *